United States Patent Office 3,350,377
Patented Oct. 31, 1967

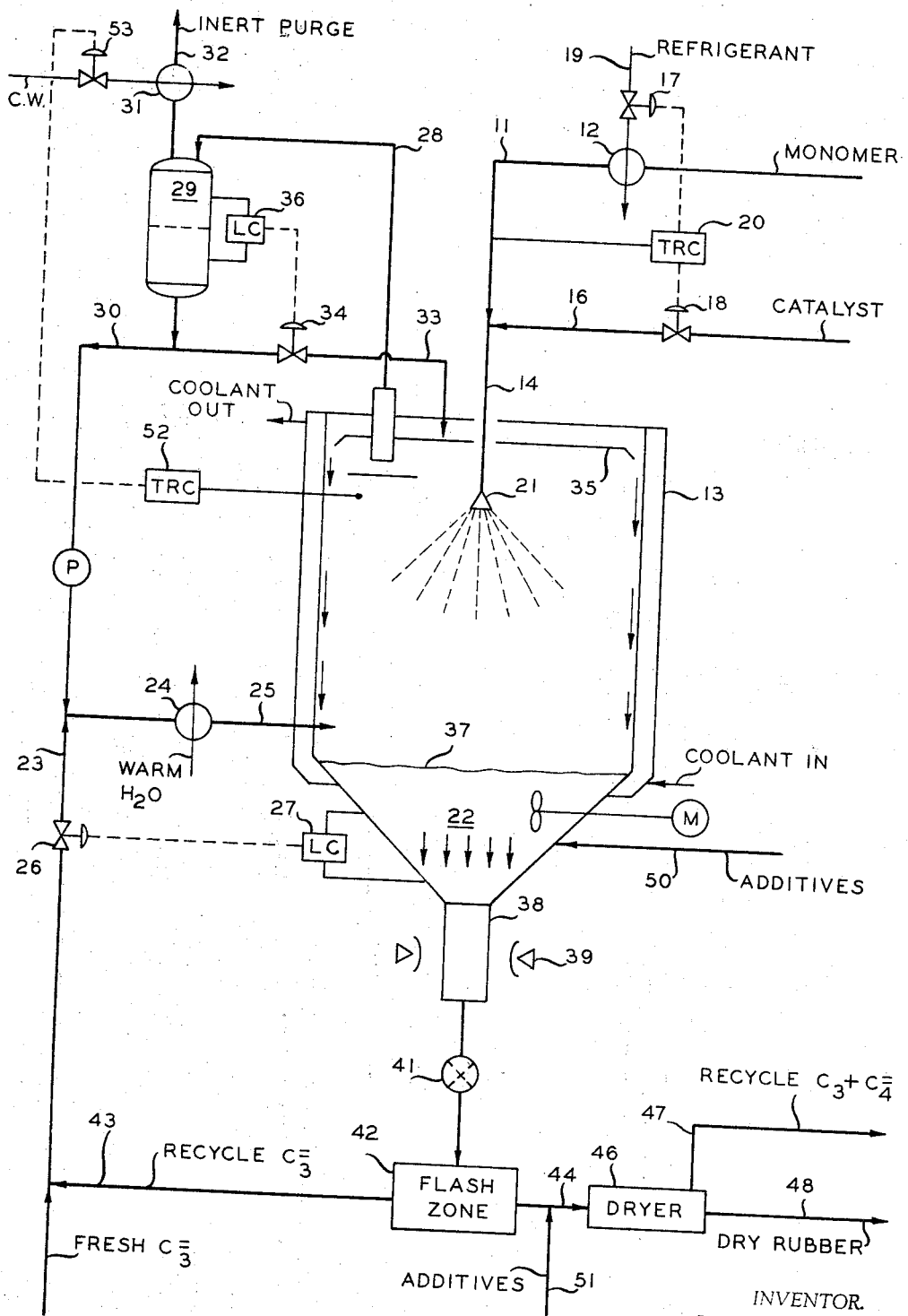

3,350,377
BULK POLYMERIZATION OF CONJUGATED DIOLEFINS
Donald D. Norwood, Bartlesville, Okla., assignor to Phillips Petroleum Company, a corporation of Delaware
Filed June 3, 1963, Ser. No. 285,004
7 Claims. (Cl. 260—94.2)

This invention relates to bulk polymerization. In one aspect it relates to bulk polymerization of polymerizable monomers for the production of rubbers and of plastics. In another aspect, it relates to bulk polymerization of conjugated dienes either alone or in admixture with each other and/or with, in minor amounts, one or more monomeric 1-olefinic materials.

The most economic method of manufacturing rubbers and plastics is polymerizing the monomeric materials in bulk without the expense, etc., of employing a solvent for the monomeric feed materials. The use of solvents in commercial solution processes involves producing a solution of the monomer, or monomers, and carrying out the actual polymerization reaction in solution, then separating the polymeric material from the solvent, purifying the separated solvent if necessary, and recycling the solvent in the process.

For example, polymerization of butadiene to polybutadiene is normally carried out in relatively dilute solution in a solvent that requires a high degree of prepurification. Dilute solution polymerization is required to facilitate heat transfer and mixing in conventional type reactors. More concentrated solutions can be handled in non-conventional reactors, however, heat transfer becomes limiting and investment costs become prohibitive. Butadiene polymerization rates increase as the solvent to monomer ratio is decreased, and decrease with temperature decrease.

An object of this invention is to provide apparatus and a process for the bulk polymerization of polymerizable monomers. Another object of this invention is to provide apparatus and a process for the polymerization of polymerizable monomers in the absence of a solvent. Yet another object of this invention is to provide apparatus and a process for polymerization of polymerizable hydrocarbon monomers in the absence of a solvent. Still other objects and advantages of this invention will be realized upon reading the following description which, taken with the attached drawing, forms a part of this specification.

According to the present invention, I spray a mixture of monomer, or monomers, admixed with a suitable polymerization catalyst at a temperature below polymerization initiation temperature downwardly in the upper portion of a polymerization tower provided with a settling leg of reduced cross-sectional area. As the spray droplets fall downwardly in the tower, they are heated to polymerization temperature by upflowing hot vapor of a volatile hydrocarbon quench liquid filling the lower portion of said tower. Bulk polymerization then proceeds rapidly, with the hydrocarbon vapors absorbing exothermic heat of polymerization, thereby preventing run away or otherwise undesirably rapid polymerization. Before reaching the surface of the quench liquid, the unvaporized monomeric material is nearly completely converted to polymer. The polymer particles thus formed are permitted to be quenched in the hydrocarbon quench liquid, and to settle into the settling leg. These particles contain only a very small amount of the original liquid monomeric material.

Shortstop, antioxidant, extender oil in the case of a rubbery polymer, carbon black or other pigment, or any other ingredient may be added to the polymer accumulated in the settling leg, to halt further polymerization, and retard agglomeration tendencies. Alternatively, the less volatile additives may be introduced directly below the surface of the quench liquor.

The concentrated polymer slurry is withdrawn from the settling leg and passed to a reduced pressure zone for flashing off most of the volatile hydrocarbon. The resulting polymer solids are passed to a driving zone for removal of residual hydrocarbon and monomer. The vapors may be condensed and fractionated for recycle.

The drawing illustrates, in a diagrammatic form, an arrangement of apparatus parts for carrying out the process of this invention.

In the drawing, reference numeral 11 identifies a conduit thru which is passed, from a source not shown, a liquid monomeric material, such as butadiene, to be polymerized. A heat exchanger 12, operating as a cooler, cools the charge material to a first lower temperature at which polymerization will not occur, which then passes to a jacketed spray vessel 13 by way of conduit 14. A suitable catalyst for the process, passes from a source not shown, through a conduit 16 and is incorporated with the charge monomer in conduit 14. Motor valves 17 and 18 are disposed in conduits 19 and 16, respectively. These motor valves are operatively responsive to a temperature recorder controller 20 which senses the monomer temperature in conduit 11, and serves to throttle back the catalyst flow rate when its temperature approaches or exceeds the desired level and/or increase refrigerant flow rate.

The mixture of catalyst and monomeric feed material is then sprayed downwardly in the upper portion of vessel 13 by spray nozzles 21. Disposed in the lower conical portion of vessel 13 is a volatile hydrocarbon quench liquid which is liberating hot vapors. In order to start up the polymerization process, however, quench liquid is introduced from a source via conduit 23, passed through a heater, and the resulting vapors introduced via conduit 25 through the wall of vessel 13. A motor valve 26 is disposed in quench liquid make up conduit 23, and is operatively responsive to a level controller 27 adjacent the lower portion of vessel 13, thereby permitting make-up of any hydrocarbon lost from the system. A cooling medium may be circulated through the jacket.

The heated hydrocarbon vapors, on rising upwardly in vessel 13, warm the downflowing spray droplets to a second higher temperature at least above the polymerization initiation temperature. For example, the boiling point of pure propane as a hydrocarbon quench liquid at 350 p.s.i.a., is 150° F., which is well above the polymerization initiation temperature of a butadiene monomer-butyl lithium catalyst mixture. Once polymerization is started, most, if not all, of the hydrocarbon vapors for heating the spray droplets will be generated by the hot polymer solids entering the liquid hydrocarbon quench liquor 22.

Upon rising in the reaction zone, the quench liquid vapor is further heated by the polymerizing droplets, it in turn heating more of the monomer-catalyst mixture sprayed into the tower. Most of the quench vapors reaching the top of vessel 13 condense on the cooled walls of said vessel, and flow back into the hydrocarbon liquid phase. Remaining vapors are withdrawn through a conduit 28 to an accumulator 29, from which a portion of the vapors pass through heat exchanger 31, serving as a reflux condenser, non-condensibles passing therefrom to purge via line 32. Liquid is withdrawn from the bottom of accumulator 29 and is passed via conduit 33 into the upper portion of vessel 13 and distributed over baffle 35. A motor valve 34 is disposed in conduit 33, and is operatively responsive to a level controller 36 on accumulator 29, and thereby maintains a desired liquid level therein. A portion of the hydrocarbon liquid withdrawn from reflux accumulator 29 is pumped via conduit 30 to vapor generator 24 to provide additional vapor for absorbing heat of reaction of the polymerization.

The polymerization reaction occurs rapidly and by the time the spray droplets of monomeric material reach the hydrocarbon quench liquid level 37, polymerization is substantially complete and the droplets are solid particles. These solid particles contain only a minor amount of unreacted liquid monomer. The solid polymer particles fall into the boiling but relatively cooler hydrocarbon quench liquid to be cooled, and then settle into the lower reduced portion, or settling leg, 38 of said vessel 13. The polymer solid particles accumulate in leg 38, and when the level rises to that detected by solids scannner 39, the polymer solids may be withdrawn from said settling leg to a separation zone for removal of unreacted monomer and quench liquid therefrom via intermittent discharge valve 41.

The polymer slurry is passed to a reduced pressure zone 42 for flashing off most of the residual volatile hydrocarbon being drawn off via conduit 43, which may be condensed and fractionated for recycle to the quench liquor 22. Liquid withdrawn from flash zone 42 is passed via conduit 44 to a dryer or extruder-devolatilizer 46 for removal of the remaining hydrocarbon liquid and monomer via conduit 47. Dry polymer solids are withdrawn via conduit 48. Polymerization inhibiting agents may be introduced into the polymer slurry via conduit 51 to halt further polymerization, and thereby reduce polymer agglomeration tendencies that might be caused by further polymerization of any reject monomer. Alternatively, the less volatile additives may be introduced via conduit 50 below quench liquor level 37, preferably including the short stop.

Temperature recorder controller 52 senses the temperature in the reaction zone. When the reaction temperature rises, motor valve 53 is signaled to open further, admitting more cooling water to condenser 31, thereby providing more cooled, condensed hydrocarbon to be reintroduced via conduit 33 and baffle 35 to the wall surfaces in the reaction zone. Alternatively, cooling medium can be circulated thru the jacket of vessel 13 to remove a portion of heat of reaction.

As an example of the operation of the process of this invention, a feed stock of 5,000 lbs./hr. of 1,3-butadiene (monomer) is charged through conduit 11 and cooled to 110° F. in heat exchanger 12. Next, butyllithium in a nonvolatile solvent, such as hexanes or higher paraffin, is metered via conduit 16 to the monomer in-line. This catalyst is also cooled to about 100° F., or, in some instances, it need not be cooled since the volume ratio of the catalyst butadiene monomer feed is very low. Polymerization in conduit 14 and in slurry nozzles 21 is negligible because of the low temperature of the feed mixture. As spray droplets form, they pass downwardly and countercurrently with respect to upflowing vapors of hydrocarbon quench liquor 22 preferably propane. These vapors are heated to such a temperature so as to heat the sprayed monomer to a suitable reaction temperature of approximately 150° F. At this temperature, polymerization occurs quite rapidly. The polymerization reaction is exothermic, thus tending to heat the polymerizing spray to a still higher temperature. This higher temperature in conjunction with the up-flowing hydrocarbon vapors also vaporizes a portion of the butadiene monomer. Heat of vaporization is endothermic, thus neutralizing or cancelling a good portion of the exothermic heat of polymerization, and thereby preventing run away and controlled polymers.

As previously described, when the reaction temperature exceeds a desirable level of approximately 150° F., the flow of condensed hydrocarbon quench liquor via conduit 33 to the walls of the reaction zone is increased to aid in bringing the temperature back to the desired level. In this manner the maximum temperature at any location in vessel 13 is approximately 150° F. Pressure is maintained at about 350 p.s.i.a. (lbs./sq. inch absolute) in accumulator 29. The condensate temperature is approximately 100° F.

While in the above instance the temperature of about 150° F. and a pressure of about 350 p.s.i.a. are maintained in the reactor, these operating conditions are variable. For example, for polymerizing butadiene monomer alone the reaction temperature can be varied from about 100° F. to about 270° F., pressure can be varied from about 100 p.s.i.a. to about 1000 p.s.i.a. Flash drum 42 temperature likewise can vary from about −44° F. to about 60° F., and the pressure can range from about 15 p.s.i.a. to about 100 p.s.i.a.

In the above example, a solution of butyllithium is injected into the monomer stream at the rate of about 0.05 part by weight per 100 parts by weight of butadiene monomer. This concentration of butyllithium can be varied, for example, between about 0.01 to 0.2 part by weight per hundred parts by weight of butadiene.

In this instance, one part stearic acid per hundred parts polymer is added to the slurry conduit 44 to neutralize the lithium-containing catalyst. On polymerizing 1,3-butadiene produces a rubbery polymer.

Other polymerizable monomeric materials than butadiene, as feed, can be used in this process for producing rubbery polymers, such as 2-methyl-1,3-butadiene, 2,3-dimethyl-1,3-butadiene, 2-methyl-1,3 - pentadiene, chloroprene, 1-cyanobutadiene, 2,3-dimethyl-1,3-pentadiene, 2-methyl-3-ethyl-1,3-pentadiene, 2-methoxybutadiene, 2-phenylbutadiene. 1-olefins polymerizable with the justmentioned dienes are such as ethylene, propylene, 1-butene, 1-hexene, isobutylene, styrene, methyl styrene, and the like. Catalyst systems used in polymerizing the dienes, and dienes with 1-olefins include, as catalysts, organometals, organometal hydrides of metals of Groups I, II and III of the Periodic System, in combination with a metal halide, such as titanium trichloride and/or titanium tetraiodide, or the nonmetal iodine. Examples of suitable organometals are trimethylaluminum, triethylaluminum, and diethyl hydrogen aluminum. Suitable catalyst inactivating or shortstop agents include such materials as hydroquinone, pyrogallol, catechol, aniline, quinoline, fatty acids such as stearic acid, a preferred inactivating agent being rosin acid. Suitable antioxidants are N-isopropyl-N'-phenyl-p-phenylene diamine, methylene-2,3'-bis(4-methyl-6-tert-butylphenol), and other similar materials.

Still other types of hydrocarbons can be polymerized according to this invention, for example, such mono-1-olefins as propylene, butylene, isobutylene, other 1-olefins such as styrene, methyl styrene, etc., or mixtures of any two or more thereof. Monomer mixtures of one or more of these 1-olefins with low concentrations of ethylene can also be employed as feed materials and sprayed as liquid droplets into the reaction vessel when maintained under suitable pressure conditions. The process is, in general, not applicable to polymerization of ethylene alone because of its relatively low critical temperature. Ethylene has a critical temperature of about 49° F. To be operable, a feed stock must be a liquid at polymerization temperature. Pressure is maintained sufficiently high to make certain that the sprayed feed monomeric material is liquid. Propylene has a critical temperature of about 197° F. Thus, to be polymerized according to this invention, polymerization temperature for propylene must be below 197° F. and if ethylene is to be polymerized alone the polymerization temperature must be below the abovementioned 49° F. However, mixtures of ethylene with other 1-olefins can be polymerized at temperatures above the critical temperature of ethylene as long as the feed material is sprayable as a liquid at a suitable polymerization temperature.

Some catalysts employed in the mono-1-olefin polymerization are liquid or are solids which are soluble in a liquid hydrocarbon carrier. Other catalysts which are insoluble in hydrocarbons can also be used. Catalyst systems suitable for use can be broadly defined as comprising an organometal compound and a metal salt. A particularly suitable catalyst is one which comprises (a) a compound having the formula $R_nMX_m$, wherein R is an alkyl, cycloalkyl or aryl radical or combinations of these radicals, such as alkaryl, aralkyl and alkylcycloalkyl, X is hydrogen or a halogen, including chlorine, bromine, iodine and fluorine, M is aluminum, gallium, indium or thallium, $n$ is from 1 to 3, inclusive, $m$ is from zero to 2, inclusive, and the sum of $m$ and $n$ is equal to the valence of the metal M, and (b) a halide of a metal of Groups IV–B, V–B, VI–B or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ which can be employed include trimethylaluminum, triisobutylaluminum, tri-n-butylaluminum, tri-n-pentylaluminum, triisooctylaluminum, tri-n-dodecylaluminum, triphenylaluminum, triethylgallium, triphenylgallium, tricyclohexylgallium, tri-n-butylindium, triethylthallium, diethylaluminum hydride, $CH_3AlCl_2$, $(CH_3)_2AlCl$, $C_2H_5AlCl_2$, $(C_2H_5)_2AlCl$, $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr_2$ (benzene derivative), $C_{20}H_{41}GaBr_2$, $(C_{14}H_{29})_2GaF$, $(C_6H_5)_2InCl$ (benzene derivative), $C_8H_{17}InF_2$, $(C_6H_{11})InBr_2$ (cyclohexane derivative), 3-methylcyclohexylaluminum dichloride, 2-cyclohexylethylgallium dichloride, p-tolylberyllium iodide, di-(3-phenyl-1-methylpropyl)indium fluoride, 2 - (3-isopropylcyclohexyl)ethylthallium dibromide, and the like.

The metal halide component of the catalyst system is preferably a halide of a Group IV–A metal, i.e., titanium, zirconium, hafnium and germanium. However, it is to be understood that halides of metals of the other groups specified above, such as vanadium, molybdenum, tungsten, cobalt, and iron can also be employed in the catalyst system. The trichlorides, trifluorides, tribromides, and triiodides, as well as the tetrachloride, tetrafluorides, tetrabromides and tetraiodides of the various metals, can be used in the catalyst system, either individually or as mixtures of two or more of the metal halides. It is usually preferred to employ a trichloride, such as titanium trichloride, in the polymerization. Suitable nonvolatile shortstops or catalyst inactivating agents are used in deactivating the just-mentioned catalyst by addition through conduit 55.

There are a number of lithium-containing catalysts, or initiators, suitable for polymerizing 1,3-butadiene according to this invention. These materials have the formula $RLi_x$, wherein R is a hydrocarbon radical selected from the group consisting of aliphatic, cycloaliphatic and aromatic radicals and $x$ is an integer from 1 to 4, inclusive. The R in the formula has a valence equal to the integer and preferably contains from 1 to 20, inclusive, carbon atoms, although higher molecular weight compounds can be utilized. In preparing the polybutadiene, it is often preferred to use an alkyllithium compound, such as n-butyllithium, as the catalyst. This catalyst is commercially available in the form of a hydrocarbon solution. Examples of other suitable organolithium compounds include methyllithium, isopropyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithiodicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,3,5-tetralithiocyclohexane 1,2,3,5 - tetralithio-4-hexylanthracene and the like.

Other pigments fillers or reinforcing agents than carbon black are also useful herein and are added by way of the extruder-devolatilizer, as mentioned relative to carbon black. Such other pigments, fillers or reinforcing agents are titanium dioxide, silica, coal tar resins and others known in the art. Extender oils, such as petroleum distillates; vegetable oils, such as linseed and soybean oils; esters, such as butyl cellosolve pelargonate; di-n-hexyladipate; and trioctyl phosphate; chlorinated hydrocarbons; ethers; ketones; turpenes; gum turpentine; resin; pine tar; coal tar products, such as liquids from distillates, including alkyl naphthalenes and polynuclear aromatics; semisolids from coal tar, including low molecular weight polymers of coumarone-indene, and related resins; liquid polymers of conjugated dienes such as liquid polybutadiene and liquid polyisoprene; and clay tower polymers. These extender oils and materials are used only when the polymer produced according to this invention is a rubber-like polymer.

However, such pigment agents as carbon black, titanium dioxide, and other coloring materials, can be used when the polymer produced according to this invention is a resin as well as a rubber-like material.

Solid materials as catalysts or as catalyst supports would be quite difficult to separate from the produced solid polymer particles as will be realized by those skilled in such art. However, such catalyst supports can be used and allowed to remain in the polymer if they do not interfere with the end use of the product.

The process of this invention is characterized by a number of advantages over solution polymerization monomers, particularly the diolefin. Firstly, high monomer concentrations in the spray droplets result in extremely high reaction rates. Secondly, the handling of high polymer solids concentration as a slurry in hydrocarbon quench liquid is possible without the usual high solution viscosities, and their attendant handling problems. Thirdly, exothermic heat of polymerization is removed by direct transfer to the hydrocarbon vapors with a minimum temperature gradient. Fourthly, the invention permits the use of a low cost hydrocarbon for polymer quenching, and polymer solids handling. Fifthly, in the drying steps, the energy requirements are comparatively low, and finally, the catalyst requirements per pound of polymer are comparatively lower than those used in solution polymerization.

While certain embodiments of the invention have been described for illustrative purposes, the invention obviously is not limited thereto.

I claim:
1. A method for bulk polymerization of monomeric liquid material comprising:
   (a) maintaining said monomeric liquid material at a first temperature at which polymerization will not occur;
   (b) admixing a suitable polymerization catalyst with said monomeric material at said first temperature;
   (c) spraying the resulting admixture downwardly in the upper portion of a polymerization zone;
   (d) passing the vapor from a volatile hydrocarbon quench liquid heated to a second temperature at least above the polymerization initiation temperature of said admixture upwardly in said polymerization zone, thereby heating the downwardly flowing spray of said admixture, and thus initiating polymerization;
   (e) permitting the polymer to quench and settle in the lower portion of said polymerization zone containing the relatively cooler quench liquid thereby vaporizing at least a portion of said quench liquid to produce said vapors that pass upwardly in said polymerization zone; and (f) withdrawing polymer solids from said lower portion.

2. The process according to claim 5 wherein said quench liquid is recovered from said separation zone suitable for reuse in said polymerization zone.

3. The process of claim 1 wherein said polymerizable monomeric material comprises 1,3-butadiene.

4. The process of claim 1 wherein said catalyst comprises n-butyllithium.

5. A method for bulk polymerization of monomeric liquid material comprising:

(a) cooling said monomeric liquid material to a first temperature at which polymerization will not occur;

(b) admixing a suitable polymerization catalyst with said monomeric material at said first temperature;

(c) spraying the resulting admixture downwardly in the upper portion of a polymerization zone;

(d) passing the vapor from a volatile hydrocarbon quench liquid heated to a second temperature at least above the polymerization initiation temperature of said admixture upwardly in said polymerization zone, thereby heating the downwardly flowing spray of said admixture, and thus initiating polymerization;

(e) permitting the polymer to quench and settle in the lower reduced portion of said polymerization zone containing the relatively cooler quench liquid thereby vaporizing at least a portion of said quench liquid to produce said vapors that pass upwardly in said polymerization zone; and (f) withdrawing polymer solids from said lower portion to a separation zone for removal of unreacted monomer and quench liquid therefrom.

6. A method for bulk polymerization of monomeric liquid material comprising:

(a) cooling said monomeric liquid material to a first temperature at which polymerization will not occur;

(b) admixing a suitable polymerization catalyst with said monomeric material at said first temperature;

(c) spraying the resulting admixture downwardly in the upper portion of a polymerization zone;

(d) passing the vapor from a volatile hydrocarbon quench liquor heated to a second temperature at least above the polymerization initiation temperature of said admixture upwardly in said polymerization zone, thereby heating the downwardly flowing spray of said admixture and thus initiating polymerization;

(e) permitting the polymer to quench and settle in the lower reduced portion of said polymerization zone containing the relatively cooler quench liquor thereby vaporizing at least a portion of said quench liquor to produce said vapor that passes upwardly in said polymerization zone;

(f) introducing polymerization inhibiting agents into the resulting polymer slurry to halt further polymerization, and thereby retard polymer agglomeration tendencies;

(g) and withdrawing polymer solids from said reduced portion to a separation zone for removal of unreacted monomer and quench liquor therefrom.

7. The process according to claim 1 wherein said vapor from said volatile hydrocarbon quench liquid in said polymerization zone is withdrawn, condensed, and reintroduced on the wall surfaces of said zone to aid in control of the polymerization zone temperature.

References Cited

UNITED STATES PATENTS

| | | | |
|---|---|---|---|
| 3,002,961 | 10/1961 | Kirschner et al. | 260—93.7 |
| 3,182,050 | 5/1965 | Irvin | 260—94.2 |
| 3,193,360 | 6/1965 | Scoggin | 260—94.9 |

JOSEPH L. SCHOFER, *Primary Examiner.*

H. I. CANTOR, H. WONG, *Assistant Examiners.*